Patented Apr. 20, 1954

2,676,188

UNITED STATES PATENT OFFICE 2,676,188

ACYLATED GLYCINAMIDES

William F. Bruce, Havertown, and Joseph Seifter, Willow Grove, Pa., assignors, by mesne assignments, to American Home Products Corporation, New York, N. Y., a corporation of Delaware No Drawing. Application December 16, 1950, Serial No. 201,242

5 Claims. (Cl. 260—559)

This invention relates to substituted glycinamides, and more particularly to acylated acetamides having the formula

RR₀NCH₂CONR'R'' wherein R stands for a six-membered carbocyclic radical, R₀ represents an acyl radical, both attached to the alpha-amino group, while R' and R'', which are attached to the amido group, represent alkyls.

The compounds of the invention are useful intermediates, as for example in the preparation of quaternary ammonium compounds or more complex acetamides or fatty acid amides. However, many of the compounds have been discovered to demonstrate a pharmacological action sufficiently impressive to make them valuable primarily as therapeutics. Thus, many have been found to possess one or more of the following pharmacological actions: local anesthetic, pressor, depressor, convulsant, spasmolytic, analgesic, soporific or sedative action.

The compounds of the invention may be prepared by first reacting chloracetyl chloride with the appropriate amine HNR'R'' wherein R' and R'' have the meaning as indicated above. The chloracetamide so formed may then be reacted in well known manner with the secondary amine RNH₂ to form the substituted glycinamide RNHCH₂CONR'R'' in the manner taught in co-pending application Serial No. 26,714, filed May 12, 1948, now Patent No. 2,568,142, dated September 18, 1951.

Concerning the amine RNH₂, the radical R as already indicated stands for an aromatic radical of the monocyclic, benzene series. As specific examples of contemplated radicals are the phenyl and substituted ring radicals with at least one of the hydrogens on the ring replaced with carboxy, carbalkoxy, alkoxy, alkyl, halogen, nitro or other non-interfering substituents.

The alpha - N - monosubstituted acetamide formed as described in Patent No. 2,568,142 is finally reacted with an appropriate acylating agent such as carboxylic acid anhydrides, esters or halides, with the latter being preferred. These halides may be represented by the formula R₀X, where R₀ stands for acyl radical while X represents the halogen. As examples of acylating agents contemplated may be mentioned the halides of aromatic carboxylic acids such as benzoic acid, the hydroxybenzoic acids, the nitrobenzoic acids, the alkoxybenzoic acids, the carboxybenzoic acids, the carboalkoxybenzoic acids, the alkylbenzoic acids, the halobenzoic acids and acids of similar type having non-interfering substituents. Also contemplated are halides of heterocyclic, aralkyl and alkyl carboxylic acids as well as their derivatives, as for example the sulphur, oxygen or nitrogen containing heterocyclic carboxylic acids, as thiophene, furan or pyridine carboxylic acids, cinnamic acid, chloroacetic acid, chloropropionic acid, hydroxypropionic acid, isobutyric acid, and so forth.

It is, of course, not always necessary to start with chloracetyl chloride in preparing the compounds of the invention since many of the alpha-N-monosubstituted acetamides needed for the final acylating reaction are described in the prior art and are presumably available.

Briefly describing the acylating reaction itself, the appropriate acetamide is dissolved in a suitable solvent such as toluene and an approximately equimolecular amount of pyridine is added. To the mixture is then added a substantially equimolecular amount of the selected acylating agent and the mixture is then permitted to react either at room temperature or higher, preferably at about 100° C. for about an hour or more. After the reaction is completed, the mixture is washed with water and dilute acid to remove pyridine and the solvent is then removed by low pressure distillation whereby the desired reaction product is obtained as an oil or a solid residue. The product may be purified by recrystallization from a solvent such as hexane, acetone or ethyl acetate or by distillation in the event it is a liquid product.

The following examples illustrate the method of preparation of the acylated glycinamides in detail.

EXAMPLE 1

*N-benzoylanilino-N,N-diethyl acetamide*

To a solution of 298 grams of alpha-chloraceto N,N-diethylamide and 186 grams of aniline in 1500 cc. of n-butanol, 100 grams of powdered sodium carbonate was added and the mixture refluxed for two hours. An additional 100 grams of sodium carbonate was then added, and refluxing continued for two hours more. After adding 12 grams more sodium carbonate, with the observation that no further carbon dioxide evolved, about half the butanol was removed on an oil bath. The solids consisting largely of inorganic salts were filtered off and the filtrate concentrated in vacuo and distilled. The product, alpha-anilino-N,N-diethyl acetamide weighed 315 grams and boiled at 155–170° C. at 0.7 mm.

or 180–190° C. at 6 mm. It solidified on standing to a pale yellow mass melting at 38° C. A sample was crystallized from ethyl acetate without altering the melting point.

ANALYSIS

|  | Carbon | Hydrogen | Nitrogen |
|---|---|---|---|
| Calculated for $C_{12}H_{18}N_2O$ | 69.8 | 8.7 | 13.55 |
| Found | 69.84 | 8.64 | 13.31 |

To 51 grams of anilino-N,N-diethyl acetamide, technical grade, in 100 cc. of pyridine (over BaO) was added 41 grams of benzoyl chloride with stirring and cooling. After half an hour, this solution was poured into 500 cc. of water and extracted twice with 100 cc. of benzene. The benzene solution was concentrated on a steam bath to a yellow oil which on standing solidified. The solid was crystallized from ethyl acetate to give 40 grams of colorless crystals melting at 133°. From the residues, 7 grams of the same grade of product was obtained, with 7 grams of less pure material.

ANALYSIS

|  | Carbon | Hydrogen | Nitrogen |
|---|---|---|---|
| Calculated for $C_{19}H_{22}N_2O_2$ | 73.52 | 7.14 | 9.02 |
| Found | 73.73 | 7.26 | 9.18 |

EXAMPLE 2

*N-salicyloylanilino-N,N-diethyl acetamide*

To 41 grams of anilino-N,N-diethyl acetamide in 16 grams of pyridine and 150 cc. of toluene add salicyloyl chloride made from 28 grams of salicylic acid and 28 grams of thionyl chloride and 0.1 gram of aluminum chloride anhydrous. After addition of water and washing out the pyridine with 1% HCl and water, the toluene was evaporated on a steam bath to leave a light yellow syrup which very slowly crystallized. On taking these crystals up in acetone, filtering and cooling, 20 grams of white crystalline product was obtained melting at 135–136° C. (bar), 123–124° C. (cap.).

ANALYSIS

|  | Carbon | Hydrogen | Nitrogen |
|---|---|---|---|
| Calculated for $C_{19}H_{22}N_2O_3$ | 70.0 | 4.76 | 8.58 |
| Found | 70.2 | 6.78 | 8.61 |

EXAMPLE 3

*N-benzoyl-p-toluidino-N,N-diethyl acetamide*

A solution of 428 grams of p-toluidine in 4 l. of n-butanol was refluxed with 603 grams of chloro-N,N-diethyl acetamide and 454 grams of dry sodium carbonate for 16 hours with stirring in the presence of 10 marbles. After cooling, water was added to dissolve the salt. The butanol was concentrated and the residue distilled. The product collected at 180–185° C. at 1.5 mm. weighed 411 grams (47%). The product solidified and melted at 58–60° C. On crystallization from methanol, the melting point was 59–60° C.

ANALYSIS

|  | Carbon | Hydrogen | Nitrogen |
|---|---|---|---|
| Calculated for $C_{13}H_{20}N_2O$ | 70.91 | 9.09 | 12.73 |
| Found | 70.56 | 9.03 | 12.81 |

In a 500 cc. Erlenmeyer flask was placed 22 grams of p-toluidino-N,N-diethyl acetamide dissolved in 80 cc. of toluene, 14 grams of benzoyl chloride, and 7.9 grams of pyridine. The reaction mixture was placed on the steam bath and heated for one hour. After cooling, it was washed twice with water, once with dilute hydrochloric acid, and twice again with water. The toluene was distilled off under vacuum. The residue solidified. It was recrystallized from n-heptane. M. P. 111.5–112° C.

EXAMPLE 4

*(N-benzoyl-p-toluidino)N,N-dimethyl acetamide*

The para-toluidino-N,N-dimethyl acetamide necessary for the following procedure was prepared in the same manner as in the preceding example, merely using the corresponding chloracetamide.

In a 500 cc. Erlenmeyer flask was placed 19.6 grams of p-toluidino-N,N-dimethyl acetamide dissolved in 80 cc. of toluene, 14 grams of benzoyl chloride, and 7.9 grams of pyridine. The reaction mixture was heated on the steam bath for one hour. After cooling, it was washed twice with water, once with dilute hydrochloric acid, and twice again with water. The toluene was distilled off under vacuum. The residue solidified. It was recrystallized by dissolving in benzene and precipitated by adding n-heptane. M. P. 112.5–113° C.

EXAMPLE 5

*(N-benzoyl-m-nitroanilino)N,N-diethyl acetamide*

In a 500 cc. Erlenmeyer flask was placed 25 grams of m-nitroanilino-N,N-diethyl acetamide dissolved in 60 cc. of toluene, 14 grams of benzoyl chloride, and 7.9 grams of pyridine. The reaction mixture was placed on the steam bath and heated for one hour. After cooling, it was washed twice with water, once with dilute hydrochloric acid, and twice again with water. The toluene was distilled off under vacuum. The residue solidified. It was crystallized from n-heptane. M. P. 156–158° C.

EXAMPLE 6

*(N-benzoyl-o-toluidino)N,N-diethyl acetamide*

A solution of 53.5 grams of o-toluidine in 500 cc. of n-butanol was refluxed with 75 grams of chloro-N,N-diethyl acetamide and 58 grams of sodium carbonate for 16 hours. After cooling, the butanol solution was washed with water, concentrated and distilled to give 98 grams of product boiling from 165–175° C. at 0.8 mm. After two redistillations, 42.8 grams of product boiling from 165–170° C. at 0.4 mm. remained. The product remained a yellow oil, $n_D^{30.5}$ 1.537. Redistillation of the foreruns gave a small additional amount of product.

In a 250 cc. Erlenmeyer flask was placed 15 grams of o-toluidino-N,N-diethyl acetamide dissolved in 50 cc. of toluene, 10 grams of benzoyl chloride, and 5.5 grams of pyridine. The reaction mixture was heated on the steam bath for one hour. After cooling, it was washed twice with water, once with dilute hydrochloric acid, and twice again with water. The toluene was distilled off under vacuum. The residue solidified. It was recrystallized from n-heptane. M. P. 87–88° C.

EXAMPLE 7

*(N-anisoyl-anilino) N,N-diethyl acetamide*

In a 500 cc. Erlenmeyer flask was placed 20.6 grams of anilino-N,N-diethyl acetamide dissolved in 80 cc. of toluene, 7.9 grams of pyridine, and 17 grams of anisoyl chloride. The reaction mixture was heated on the steam bath for one hour. It was washed twice with water, once with dilute hydrochloric acid, and twice again with water. The toluene was distilled off under vacuum. The residue solidified. It was recrystallized from n-heptane. M. P. 104.5° C.

EXAMPLE 8

*(N-cinnamoyl-anilino) N,N-diethyl acetamide*

In a 500 cc. Erlenmeyer flask was placed 20.6 grams of anilino-N,N-diethyl acetamide dissolved in 80 cc. of toluene, 7.9 grams of pyridine, and 16.6 grams of cinnamoyl chloride. The reaction mixture was heated on the steam bath for one hour. After cooling, it was washed twice with water, once with dilute hydrochloric acid, and twice again with water. The toluene was distilled off under vacuum. The residue solidified. It was recrystallized by dissolving in benzene and precipitated by adding n-heptane. M. P. 108.5° C.

EXAMPLE 9

*(N-isobutyrylanilino)-N,N-diethyl acetamide*

To 100 cc. of toluene contained in a 125 Erlenmeyer flask was added 5 grams of anilino-N,N-diethyl acetamide, 2 grams of pyridine and last of all 2.5 grams of isobutyryl chloride. The mixture was heated on a steam bath for one hour. It was then cooled and washed with water twice, dilute HCl twice, and again with water. The toluene was concentrated. The residue solidified. It was recrystallized from n-heptane. M. P. 115–116° C.

EXAMPLE 10

*(N-beta-hydroxy propionyl anilino)-N,N-diethyl acetamide*

To 250 cc. of ether contained in a three-neck 500 cc. flask, fitted with a mechanical stirrer, reflux condenser and dropping funnel was added 0.1 gram of sodium hydroxide dissolved in 10 cc. of water, and 10.3 grams of anilino-N,N-diethyl acetamide. Then 3.6 grams of beta-propiolactone was added slowly through the dropping funnel with stirring. When the addition was complete the reaction mixture was refluxed for two hours. The ether was then concentrated. The residue was a thick oil which in four days solidified. It was recrystallized from n-hexane and ethyl acetate. M. P. 76–77° C.

EXAMPLE 11

*(N-chloracetyl anilino)-N,N-diethyl acetamide*

To 100 cc. of toluene contained in a 125 cc. Erlenmeyer flask was added 5 grams of anilino-N,N-diethyl acetamide, 2 grams of pyridine and last of all 2.7 grams of chloro acetyl chloride. The mixture was heated on a steam bath for one hour. It was then cooled and washed with water twice, dilute HCl twice, and again with water. The toluene was concentrated. The residue solidified. It was recrystallized from n-heptane and ethyl acetate. M. P. 79–80° C.

EXAMPLE 12

*(N-beta-chloropropionyl anilino)-N,N-diethyl acetamide*

To 100 cc. of toluene contained in a 125 cc. Erlenmeyer flask was added 5 grams of anilino-N,N-diethyl acetamide, 2 grams of pyridine, and last of all 3 grams of beta-chloropropionyl chloride. The mixture was heated on a steam bath for one hour. It was then cooled and washed with water twice, dilute HCl twice, and again with water. The toluene was concentrated. The residue solidified. It was recrytsallized from n-heptane and ethyl acetate. M. P. 100–101° C.

EXAMPLE 13

*(N-furoylanilino)-N,N-diethyl acetamide*

To 200 cc. of toluene contained in a 500 cc. Erlenmeyer flask was added 20.6 grams of anilino-N,N-diethyl acetamide, 7.9 grams of pyridine and last of all 13 grams of furoyl chloride. The mixture was heated on a steam bath for two hours. It was then cooled, washed with water twice, dilute HCl twice, and again with water. The toluene was distilled off under vacuum. The residue solidified. It was washed with n-heptane twice and dried. M. P. 103–104° C.

EXAMPLE 14

*(N-orthochlorobenzoyl anilino)-N,N-diethyl acetamide*

In a 500 cc. Erlenmeyer flask was put 20.5 grams of anilino-N,N-diethyl acetamide in 100 cc. of toluene and 7.9 grams of pyridine. A solution of 17.5 grams of o-chlorobenzoyl chloride in 100 cc. of toluene was then added and the reaction mixture was heated for one hour on a steam bath. After cooling it was washed with water twice, with dilute hydrochloric acid once, and with water twice more. The toluene was distilled and the residue solidified and was crystallized from hexane to give crystals melting at 68–70° C.

EXAMPLE 15

*N-(o-toluoyl) anilino-N,N-diethyl acetamide*

In a 250 cc. Erlenmeyer flask was placed 8 grams of anilino-N,N-diethyl acetamide, dissolved in 100 cc. of toluene; 3 grams of pyridine; and 6 grams of o-toluoyl chloride, dissolved in 50 cc. of toluene. The reaction mixture was heated on the steam bath for one hour. After cooling the solution was washed twice with water, once with dilute hydrochloric acid, and twice again with water. The toluene was distilled off, and the residue solidified, after sitting in an ice bath for one hour. It was recrystallized from a solution of n-hexane and benzene (1 part benzene to 9 parts n-hexane). It was then dried in a desiccator, at reduced pressure, over paraffin shavings. M. P. 83–84° C.

EXAMPLE 16

*N-(p-nitrobenzoyl) anilino-N,N-diethyl acetamide*

In one liter Erlenmeyer flask was placed 20.6 grams of anilino-N,N-diethyl acetamide, dissolved in 100 cc. of toluene; 7.9 grams of pyridine; and 18.5 grams of p-nitrobenzoyl chloride, dissolved in 500 cc. of toluene. The reaction mixture was heated on the steam bath for one hour. After cooling, the solution was washed twice with water, once with dilute hydrochloric acid, and twice again with water. The toluene was distilled off and the residue solidified. It was recrystallized by dissolving in benzene, and precipitated by adding n-hexane. It was then dried in a desiccator, at reduced pressure, over parffin shavings. M. P. 119–120° C.

EXAMPLE 17

*o-Carbomethoxy benzoyl-anilino-N,N-diethyl acetamide*

In a 500 cc. Erlenmeyer flask was placed 67 grams of o-carbomethoxy-benzoyl chloride, dissolved in 100 cc. of toluene, 70 grams of anilino-N,N-diethyl acetamide dissolved in 100 cc. of toluene, and 26 grams of pyridine. The reaction mixture was heated on the steam bath for one hour. After cooling it was washed twice with water, once with dilute hydrochloric acid, and twice again with water. The toluene layer was distilled off under vacuum and the residue solidified. It was recrystallized by dissolving in toluene and precipitated upon addition of n-hexene. M. P. 110–112° C. Calculated for $C_{19}H_{24}O_4N_2$: N=7.60%; found: 7.06–7.32%.

EXAMPLE 18

*o-Carboxy-benzoyl-anilino-N,N-diethyl acetamide*

Thirty grams of o-carbomethoxy-benzoyl-N,N-diethyl acetamide, prepared as taught above, were added to 30 grams of potassium hydroxide dissolved in 270 cc. of water. It was left overnight to hydrolyze the methoxy group. After all had gone into solution, it was diluted with 1000 cc. of water. Acetic acid was then added slowly, with good stirring, until a white precipitate appeared. It was filtered off and recrystallized by dissolving in chloroform and precipitated upon the addition of n-heptane. White crystalline solid. M. P. 184–186° C.

It is clear from the above examples that other acylated glycinamides of the same type and falling within the scope of the invention may be produced in the same manner. The dialkyls, represented by R' and R'' for example, need not be the same as indicated in the examples but it is contemplated that other alkyls may be used. Thus, R' and R'' may stand for higher alkyls and particularly branched-chain higher alkyls but not exceeding 9 carbon atoms in the alkyl chain. As a specific example, it is contemplated that the primary amines RNH2 and RoNH2 may react with such chloracetamides as are formed by reacting chloracetyl chloride with methyl-2-heptylamine, methyl-(1-methyl-2-pentyl)amine, etc. It will be noted that where R' represents a higher alkyl of 6 to 9 carbon atoms, the other radical, R'', must be a lower alkyl, such as methyl or ethyl, to achieve desired pharmacological effects.

It is further contemplated that those substituted glycinamides which are less soluble in dilute acid than 0.5% by weight may be brought into satisfactory solution by the use of solubilizing surface-active emulsifying agents or detergent agents in order to obtain a more complete physiological effect of the specific glycinamide. Lipoid solvents having a physiologically non-toxic effect such as long chain fatty acid partial esters of hexitol anhydrides or oxyalkylene derivatives thereof, propylene glycol and other solvents are examples of those considered useful in admixture with the substituted glycinamides for obtaining an enhanced physiological effect. Where a suspension, rather than solubilization is desired, various well-known suspending agents, such as acacia, gelatin, carboxy-methyl cellulose, etc., may be used depending on the particular effect to be achieved.

We claim:

1. The new compound, (N-benzoylanilino)-N,N-di-lower alkyl-acetamide.

2. The new compound, (N-salicyloylanilino)-N,N-di-lower alkyl acetamide.

3. The new compound, (N-benzoyl-p-toluidino)-N,N-di-lower alkyl acetamide.

4. A substituted glycinamide having the general formula

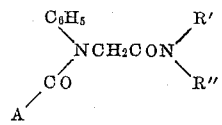

where A stands for a monocyclic, isocyclic aromatic radical while R' and R'' each represent lower alkyl radicals.

5. A substituted glycinamide having the general formula

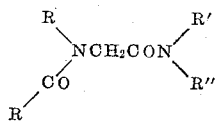

wherein R represents a member of the group consisting of phenyl and o-methylphenyl radicals while A stands for a member of the group consisting of phenyl and hydroxyphenyl radicals and R' and R'' each representing lower alkyl radicals.

References Cited in the file of this patent

UNITED STATES PATENTS

| Number | Name | Date |
|---|---|---|
| 2,406,186 | Baldwin et al. | Aug. 20, 1946 |
| 2,414,050 | Linch | Jan. 7, 1947 |
| 2,447,587 | Martin et al. | Aug. 24, 1948 |
| 2,496,882 | Martin et al. | Feb. 7, 1950 |

FOREIGN PATENTS

| Number | Country | Date |
|---|---|---|
| 172,748 | Japan | May 22, 1948 |

OTHER REFERENCES

Graenacher, "Helv. Chim. Acta," vol. 11 (1928), pp. 1228–41, and vol. 8 (1925), pp. 211–17.

Wesseley et al., "Monatshefte fur Chemie," vol. 48 (1927), pp. 1–7.